(12) United States Patent  
Zipperer et al.

(10) Patent No.: US 9,329,993 B2
(45) Date of Patent: May 3, 2016

(54) WEARABLE DEVICE ASSEMBLY WITH ABILITY TO MITIGATE DATA LOSS DUE TO COMPONENT FAILURE

(71) Applicant: NIKE, Inc., Beaverton, OR (US)

(72) Inventors: James Zipperer, Seattle, WA (US); Greg McKeag, Seattle, WA (US); Mike Lapinsky, Seattle, WA (US); Jason Haensly, Seattle, WA (US)

(73) Assignee: NIKE, Inc., Beaverton, OR (US)

( * ) Notice: Subject to any disclaimer, the term of this patent is extended or adjusted under 35 U.S.C. 154(b) by 130 days.

(21) Appl. No.: 14/301,913

(22) Filed: Jun. 11, 2014

(65) Prior Publication Data

US 2014/0372677 A1    Dec. 18, 2014

Related U.S. Application Data

(60) Provisional application No. 61/834,191, filed on Jun. 12, 2013.

(51) Int. Cl.
*G06F 12/02* (2006.01)
*G06F 11/14* (2006.01)
*G06F 11/20* (2006.01)

(52) U.S. Cl.
CPC .......... *G06F 12/0246* (2013.01); *G06F 11/142* (2013.01); *G06F 11/2097* (2013.01); *G06F 2212/7209* (2013.01)

(58) Field of Classification Search
CPC .............. G06F 12/0246; G06F 11/142; G06F 11/2097; G06F 2212/7209
See application file for complete search history.

(56) References Cited

U.S. PATENT DOCUMENTS 8,560,772 B1 * 10/2013 Piszczek ............. G06F 11/1076
                                                                                                       711/114
2006/0199659 A1 * 9/2006 Caldwell ............ A63B 69/3608
                                                                                                       473/221
2008/0067526 A1    3/2008 Chew
2008/0262786 A1   10/2008 Pavlidis
2010/0145236 A1 *  6/2010 Greenberg ........... A61B 5/1101
                                                                                                       600/595
2010/0281156 A1   11/2010 Kies et al.
2011/0214030 A1 *  9/2011 Greenberg ............. A61B 5/002
                                                                                                       714/748
2012/0117020 A1 *  5/2012 Davis .................... G06F 19/345
                                                                                                       706/54
2012/0229417 A1 *  9/2012 Badaye ................. G06F 3/0416
                                                                                                       345/174
2013/0211772 A1 *  8/2013 Ross, Jr. ............... A61B 5/6831
                                                                                                       702/141
2013/0281796 A1 * 10/2013 Pan ....................... A61B 5/7435
                                                                                                       600/301
2013/0296659 A1 * 11/2013 Addison .............. A61B 5/0205
                                                                                                       600/301
2013/0297599 A1 * 11/2013 Henshall .............. G11B 27/105
                                                                                                       707/736
2014/0070957 A1 *  3/2014 Longinotti-Buitoni A61B 5/02055
                                                                                                       340/870.01
2014/0156910 A1 *  6/2014 Uttamchandani ....... G06F 3/061
                                                                                                       711/103

FOREIGN PATENT DOCUMENTS

EP    2000083 A2   12/2008
WO    0178577 A2   10/2001

* cited by examiner

*Primary Examiner* — Hiep Nguyen
(74) *Attorney, Agent, or Firm* — Banner & Witcoff, Ltd.

(57) ABSTRACT

A wrist-worn device monitors movements of a user with a flexible circuit member. The flexible circuit member is fault tolerant. It may contain extra and/or redundant traces as well as the ability to store data on RAM if the flash memory fails or if some or all trace connections between the processor and flash memory fail. Data stored on the RAM may or may not contain less fidelity. Lower fidelity data may be used to alleviate issues arising if the RAM has less storage capacity than the flash memory.

20 Claims, 5 Drawing Sheets

WEARABLE DEVICE ASSEMBLY WITH ABILITY TO MITIGATE DATA LOSS DUE TO COMPONENT FAILURE

RELATED APPLICATION DATA

This application claims priority to, and the benefit of U.S. Provisional Patent Appln. No. 61/834,191 filed Jun. 12, 2013 and entitled "Wearable Device Assembly with Ability to Mitigate data Loss Due to Component Failure." These earlier provisional patent application is entirely incorporated herein by reference

TECHNICAL FIELD

Aspects of the invention generally relate to ways of preventing and/or mitigating data loss due to component failure and particularly relate to redirecting where data is stored and/or how it is transferred throughout the device.

BACKGROUND

While most people appreciate the importance of physical fitness, many have difficulty finding the motivation required to maintain a regular exercise program. Some people find it particularly difficult to maintain an exercise regimen that involves continuously repetitive motions, such as running, walking and bicycling.

Additionally, individuals may view exercise as work or a chore and thus, separate it from enjoyable aspects of their daily lives. Often, this clear separation between athletic activity and other activities reduces the amount of motivation that an individual might have toward exercising. Further, athletic activity services and systems directed toward encouraging individuals to engage in athletic activities might also be too focused on one or more particular activities while an individual's interest are ignored. This may further decrease a user's interest in participating in athletic activities or using the athletic activity services and systems.

Therefore, improved systems and methods to address these and other shortcomings in the art are desired.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A wrist-worn device that monitors movements of a user is provided. A curvilinear body of the wrist-worn device includes a plurality of flex areas, and an internal spine member of the wrist-worn device extends through the curvilinear body. A flexible circuit member is wrapped around and connected to the spine member. The flexible circuit member interconnects a controller and one or more sensors of a sensor assembly within the body. A solder mask applied to the flexible circuit member includes a curvilinear edge that distributes stress caused by flexing of the flexible circuit member.

The curvilinear edge may define solder mask peaks and valleys between the sides of the flexible circuit member. The solder mask peaks may exhibit a peak width and peak height, and the solder mask valleys may exhibit a valley width and valley depth. The number of solder mask peaks may match the number of solder mask valleys, peak width may match valley width, and peak height may match valley depth. The solder mask peaks and solder mask valleys may substantially also conform to a portion of a circle.

A fault tolerant flexible circuit member that prevents device failure if traces break is provided. The flexible circuit member may utilize extra traces. If the device determines that a trace is broken, other traces may be used in its place. Alternatively, or in combination with extra traces, the device may also utilize redundant traces and the ability to distinguish between broken and intact traces. Thus, if a trace breaks, one of the redundant traces can take on its function. The device may use alternative division schemes, such as schemes that divide available bandwidth between data originally intended to be sent along a trace and data originally intended to be sent along a broken trace. The device may also utilize alternative storage, such as RAM, if the flash memory becomes inoperative. In cases where the RAM has a smaller storage capacity than the flash memory, it may be necessary to reduce the size of data being stored. This can be accomplished by changing the format the data is stored in.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure. Further, headings within this disclosure should not be considered as limiting aspects of the disclosure. Those skilled in the art with the benefit of this disclosure will appreciate that the example embodiments are not limited to the example headings.

1. Example Personal Training System

1.1. Illustrative Computing Devices

Figure 1:
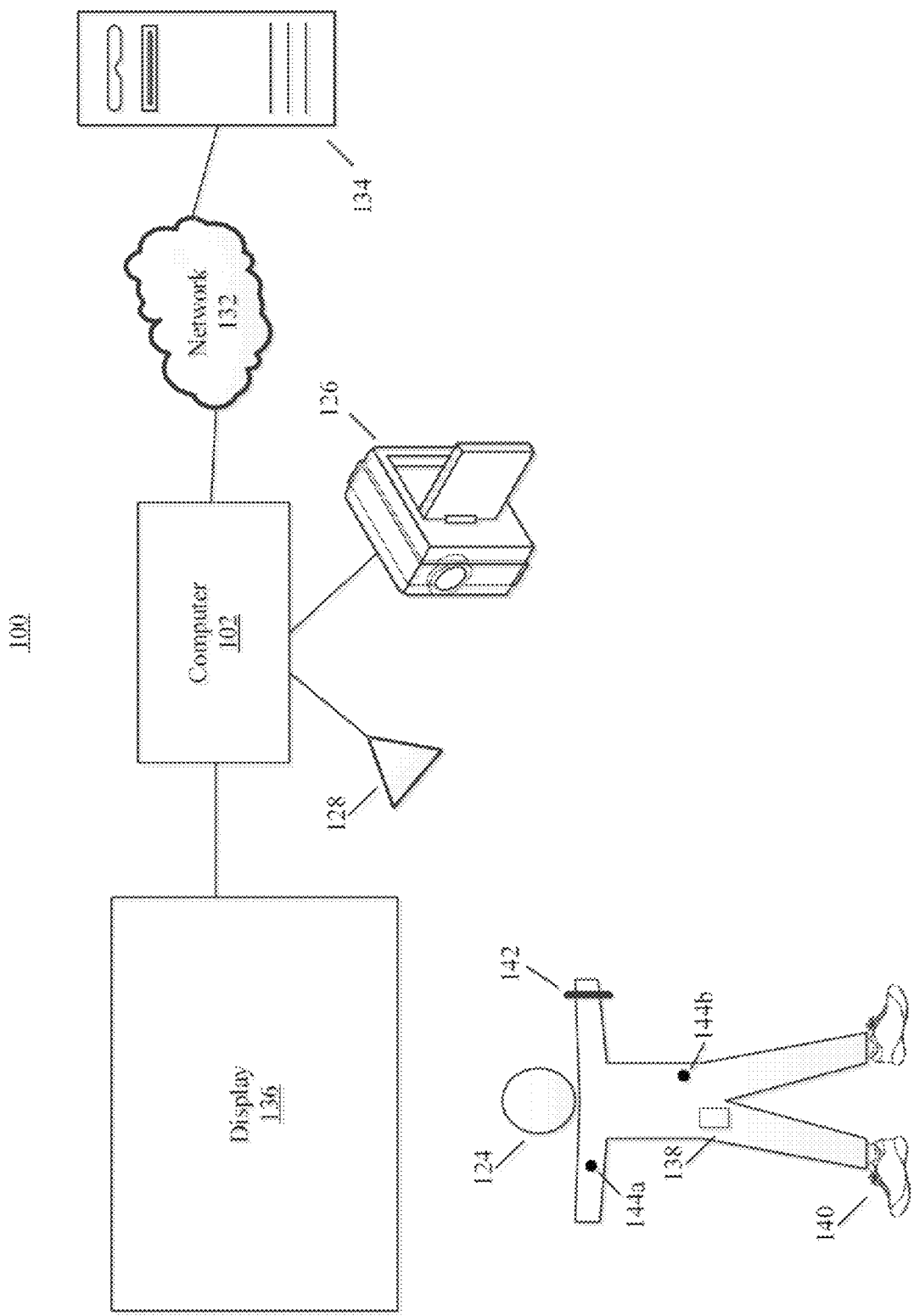
FIG. 1 is an example of an implementation of a system for providing personal training

FIG. 1 illustrates an example of a personal training system 100 in accordance with example embodiments. Example system 100 may include one or more electronic devices, such as computer 102. Computer 102 may comprise a mobile terminal, such as a telephone, music player, tablet, netbook or any portable device. In other embodiments, computer 102 may comprise a set-top box (STB), desktop computer, digital video recorder(s) (DVR), computer server(s), and/or any other desired computing device. In certain configurations, computer 102 may comprise a gaming console, such as for example, a Microsoft® XBOX, Sony® PlayStation, and/or a Nintendo® Wii gaming consoles. Those skilled in the art will appreciate that these are merely example consoles for descriptive purposes and this disclosure is not limited to any console or device.

Figure 2:
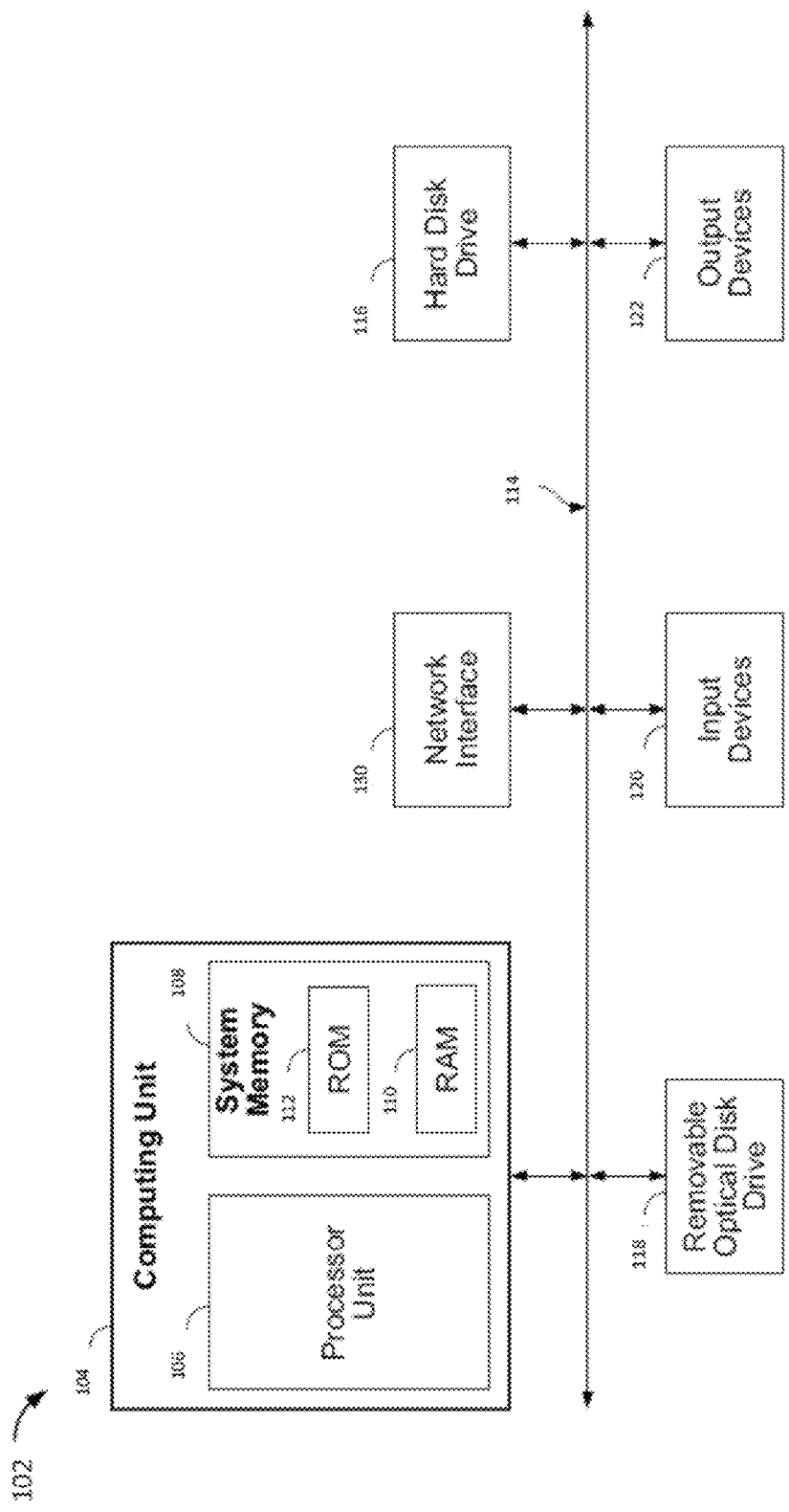
FIG. 2 is an example of an implementation of a computing device for providing personal training

Turning briefly to FIG. 2, computer 102 may include computing unit 104, which may comprise at least one processing unit 106. Processing unit 106 may be any type of processing device for executing software instructions, such as for example, a microprocessor device. Computer 102 may include a variety of non-transitory computer readable media, such as memory 108. Memory 108 may include, but is not limited to, random access memory (RAM) such as RAM 110, and/or read only memory (ROM), such as ROM 112. Memory 108 may include any of: electronically erasable programmable read only memory (EEPROM), flash memory or other memory technology, CD-ROM, digital versatile disks (DVD) or other optical disk storage, magnetic storage devices, or any other medium that can be used to store the desired information and that can be accessed by computer 102.

The processing unit 106 and the system memory 108 may be connected, either directly or indirectly, through a bus 114 or alternate communication structure to one or more peripheral devices. For example, the processing unit 106 or the system memory 108 may be directly or indirectly connected to additional memory storage, such as a hard disk drive 116, a removable magnetic disk drive, an optical disk drive 118, and a flash memory card. The processing unit 106 and the system memory 108 also may be directly or indirectly connected to one or more input devices 120 and one or more output devices 122. The output devices 122 may include, for example, a display device 136, television, printer, stereo, or speakers. In some embodiments one or more display devices may be incorporated into eyewear. The display devices incorporated into eyewear may provide feedback to users. Eyewear incorporating one or more display devices also provides for a portable display system. The input devices 120 may include, for example, a keyboard, touch screen, a remote control pad, a pointing device (such as a mouse, touchpad, stylus, trackball, or joystick), a scanner, a camera or a microphone. In this regard, input devices 120 may comprise one or more sensors configured to sense, detect, and/or measure athletic movement from a user, such as user 124, shown in FIG. 1.

Looking again to FIG. 1, image-capturing device 126 and/or sensor 128 may be utilized in detecting and/or measuring athletic movements of user 124. In one embodiment, data obtained from image-capturing device 126 or sensor 128 may directly detect athletic movements, such that the data obtained from image-capturing device 126 or sensor 128 is directly correlated to a motion parameter. Yet, in other embodiments, data from image-capturing device 126 and/or sensor 128 may be utilized in combination, either with each other or with other sensors to detect and/or measure movements. Thus, certain measurements may be determined from combining data obtained from two or more devices. Image-capturing device 126 and/or sensor 128 may include or be operatively connected to one or more sensors, including but not limited to: an accelerometer, a gyroscope, a location-determining device (e.g., GPS), light sensor, temperature sensor (including ambient temperature and/or body temperature), heart rate monitor, image-capturing sensor, moisture sensor and/or combinations thereof. Example uses of illustrative sensors 126, 128 are provided below in Section 1.3, entitled "Illustrative Sensors." Computer 102 may also use touch screens or image capturing devices to determine where a user is pointing to make selections from a graphical user interface. One or more embodiments may utilize one or more wired and/or wireless technologies, alone or in combination, wherein examples of wireless technologies include Bluetooth® technologies, Bluetooth® low energy technologies, and/or ANT technologies.

1.2. Illustrative Network

Computer 102, computing unit 104, and/or any other electronic devices may be directly or indirectly connected to one or more network interfaces, such as example interface 130 (shown in FIG. 2) for communicating with a network, such as network 132. In the example of FIG. 2, network interface 130, may comprise a network adapter or network interface card (NIC) configured to translate data and control signals from the computing unit 104 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 130 may employ any suitable connection agent for connecting to a network, including, for example, a wireless transceiver, a power line adapter, a modem, or an Ethernet connection. Network 132, however, may be any one or more information distribution network(s), of any type(s) or topology(s), alone or in combination(s), such as internet(s), intranet(s), cloud(s), LAN(s). Network 132 may be any one or more of cable, fiber, satellite, telephone, cellular, wireless, etc. Networks are well known in the art, and thus will not be discussed here in more detail. Network 132 may be variously configured such as having one or more wired or wireless communication channels to connect one or more locations (e.g., schools, businesses, homes, consumer dwellings, network resources, etc.), to one or more remote servers 134, or to other computers, such as similar or identical to computer 102. Indeed, system 100 may include more than one instance of each component (e.g., more than one computer 102, more than one display 136, etc.).

Regardless of whether computer 102 or other electronic device within network 132 is portable or at a fixed location, it should be appreciated that, in addition to the input, output and storage peripheral devices specifically listed above, the computing device may be connected, such as either directly, or through network 132 to a variety of other peripheral devices, including some that may perform input, output and storage functions, or some combination thereof. In certain embodiments, a single device may integrate one or more components shown in FIG. 1. For example, a single device may include computer 102, image-capturing device 126, sensor 128, display 136 and/or additional components. In one embodiment, sensor device 138 may comprise a mobile terminal having a display 136, image-capturing device 126, and one or more sensors 128. Yet, in another embodiment, image-capturing device 126, and/or sensor 128 may be peripherals configured to be operatively connected to a media device, including for example, a gaming or media system. Thus, it goes from the foregoing that this disclosure is not limited to stationary systems and methods. Rather, certain embodiments may be carried out by a user 124 in almost any location.

1.3. Illustrative Sensors

Computer 102 and/or other devices may comprise one or more sensors 126, 128 configured to detect and/or monitor at least one fitness parameter of a user 124. Sensors 126 and/or 128 may include, but are not limited to: an accelerometer, a gyroscope, a location-determining device (e.g., GPS), light sensor, temperature sensor (including ambient temperature and/or body temperature), sleep pattern sensors, heart rate monitor, image-capturing sensor, moisture sensor and/or combinations thereof. Network 132 and/or computer 102 may be in communication with one or more electronic devices of system 100, including for example, display 136, an image capturing device 126 (e.g., one or more video cameras), and sensor 128, which may be an infrared (IR) device. In one embodiment sensor 128 may comprise an IR transceiver. For example, sensors 126, and/or 128 may transmit waveforms into the environment, including towards the direction of user 124 and receive a "reflection" or otherwise detect alterations of those released waveforms. In yet another embodiment, image-capturing device 126 and/or sensor 128 may be configured to transmit and/or receive other wireless signals, such as radar, sonar, and/or audible information. Those skilled in the art will readily appreciate that signals corresponding to a multitude of different data spectrums may be utilized in accordance with various embodiments. In this regard, sensors 126 and/or 128 may detect waveforms emitted from external sources (e.g., not system 100). For example, sensors 126 and/or 128 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology. As a non-limited example, image-capturing devices configured to perform range phenomenology are commercially available from Flir Systems, Inc. of Portland, Oregon. Although image capturing device 126 and sensor 128 and display 136 are shown in direct (wirelessly or wired) communication with computer 102, those skilled in the art will appreciate that any may directly communicate (wirelessly or wired) with network 132.

1.3.1 Multi-Purpose Electronic Devices

User 124 may possess, carry, and/or wear any number of electronic devices, including sensory devices 138, 140, 142, and/or 144. In certain embodiments, one or more devices 138, 140, 142, 144 may not be specially manufactured for fitness or athletic purposes. Indeed, aspects of this disclosure relate to utilizing data from a plurality of devices, some of which are not fitness devices, to collect, detect, and/or measure athletic data. In one embodiment, device 138 may comprise a portable electronic device, such as a telephone or digital music player, including an IPOD®, IPAD®, or iPhone®, brand devices available from Apple, Inc. of Cupertino, California or Zune® or Microsoft® Windows devices available from Microsoft of Redmond, Washington. As known in the art, digital media players can serve as both an output device for a computer (e.g., outputting music from a sound file or pictures from an image file) and a storage device. In one embodiment, device 138 may be computer 102, yet in other embodiments, computer 102 may be entirely distinct from device 138. Regardless of whether device 138 is configured to provide certain output, it may serve as an input device for receiving sensory information. Devices 138, 140, 142, and/or 144 may include one or more sensors, including but not limited to: an accelerometer, a gyroscope, a location-determining device (e.g., GPS), light sensor, temperature sensor (including ambient temperature and/or body temperature), heart rate monitor, image-capturing sensor, moisture sensor and/or combinations thereof. In certain embodiments, sensors may be passive, such as reflective materials that may be detected by image-capturing device 126 and/or sensor 128 (among others). In certain embodiments, sensors 144 may be integrated into apparel, such as athletic clothing. For instance, the user 124 may wear one or more on-body sensors 144a-b. Sensors 144 may be incorporated into the clothing of user 124 and/or placed at any desired location of the body of user 124. Sensors 144 may communicate (e.g., wirelessly) with computer 102, sensors 128, 138, 140, and 142, and/or camera 126. Examples of interactive gaming apparel are described in U.S. Pat. App. No. 10/286,396, filed Oct. 30, 2002, and published as U.S. Pat. Pub. No. 2004/0087366, the contents of which are incorporated herein by reference in its entirety for any and all non-limiting purposes. In certain embodiments, passive sensing surfaces may reflect waveforms, such as infrared light, emitted by image-capturing device 126 and/or sensor 128. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Devices 138-144 may communicate with each other, either directly or through a network, such as network 132. Communication between one or more of devices 138-144 may take place via computer 102. For example, two or more of devices 138-144 may be peripherals operatively connected to bus 114 of computer 102. In yet another embodiment, a first device, such as device 138 may communicate with a first computer, such as computer 102 as well as another device, such as device 142, however, device 142 may not be configured to connect to computer 102 but may communicate with device 138. Those skilled in the art will appreciate that other configurations are possible.

Some implementations of the example embodiments may alternately or additionally employ computing devices that are intended to be capable of a wide variety of functions, such as a desktop or laptop personal computer. These computing devices may have any combination of peripheral devices or additional components as desired. Also, the components shown in FIG. 2 may be included in the server 134, other computers, apparatuses, etc.

1.3.2. Illustrative Apparel/Accessory Sensors

In certain embodiments, sensory devices 138, 140, 142 and/or 144 may be formed within or otherwise associated with user's 124 clothing or accessories, including a watch, armband, wristband, necklace, shirt, shoe, or the like. Examples of shoe-mounted and wrist-worn devices (devices 140 and 142, respectively) are described immediately below, however, these are merely example embodiments and this disclosure should not be limited to such.

Figure 3:
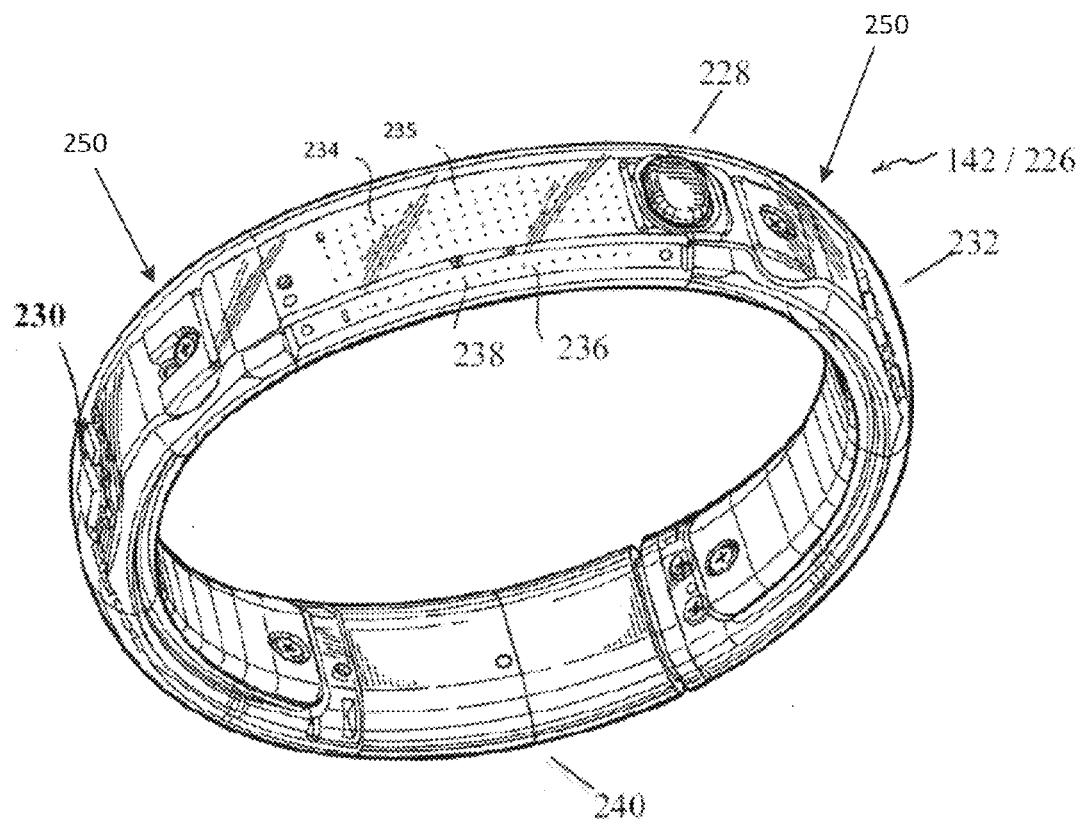
FIG. 3 is an example of an implementation of a wrist-worn sensor assembly device that monitors movements of a user.

As shown in FIG. 3, an example of an implementation of a wrist-worn sensory assembly device 226 is shown ("wrist-worn device" or "device"). The device 226 (which may resemble or be sensory device 142 shown in FIG. 1) may be configured to be worn by user 124, such as around a wrist, arm, ankle or the like. Device 226 may monitor athletic movements of a user, including all-day activity of user 124. In this regard, device assembly 226 may detect athletic movement during user's 124 interactions with computer 102 and/or operate independently of computer 102. For example, in one embodiment, device 226 may be an-all day activity monitor that measures activity regardless of the user's proximity or interactions with computer 102. Device 226 may communicate directly with network 132 and/or other devices, such as devices 138 and/or 140. In other embodiments, athletic data obtained from device 226 may be utilized in determinations conducted by computer 102, such as determinations relating to which exercise programs are presented to user 124. In one embodiment, device 226 may also wirelessly interact with a mobile device, such as device 138 associated with user 124 or a remote website such as a site dedicated to fitness or health related subject matter. At some predetermined time, the user may wish to transfer data from the device 226 to another location.

As shown in FIG. 3, device 226 may include an input mechanism, such as a depressible input button 228 assist in operation of the device 226. The input button 228 may be operably connected to a controller 230 and/or any other electronic components, such as one or more of the elements discussed in relation to computer 102 shown in FIG. 2. Controller 230 may be embedded or otherwise part of housing 232. Housing 232 may be formed of one or more materials, including elastomeric components and comprise one or more displays, such as display 234. The display may be considered an illuminable portion of the device 226. The display 234 may include a series of individual lighting elements or light members such as LED lights 234 in an exemplary embodiment. The LED lights may be formed in an array and operably connected to the controller 230. Device 226 may include an indicator system 236, which may also be considered a portion or component of the overall display 234. It is understood that the indicator system 236 can operate and illuminate in conjunction with the display 234 (which may have pixel member 235) or completely separate from the display 234. The indicator system 236 may also include a plurality of additional lighting elements or light members 238, which may also take the form of LED lights in an exemplary embodiment. In certain embodiments, indicator system may provide a visual indication of goals, such as by illuminating a portion of lighting members 238 to represent accomplishment towards one or more goals.

A fastening mechanism 240 can be unlatched wherein the device 226 can be positioned around a wrist of the user 124 and the fastening mechanism 240 can be subsequently placed in a latched position. The user can wear the device 226 at all times if desired. In one embodiment, fastening mechanism 240 may comprise an interface, including but not limited to a USB port, for operative interaction with computer 102 and/or devices 138, 140.

It will be understood that the device 226 will undergo some flexing as the device is positioned around the wrist of a user 124 or removed from the wrist of the user 124. When the fastening mechanism 240 is unlatched and the device 226 pulled open, the device will flex at various flex areas 250 to allow the wrist to be received by the device as the device wraps around the wrist of the user 124. The device 226 flexes in a similar fashion when the fastening mechanism 240 is unlatched and the device pulled open to remove the device from the wrist of the user 124. In the example device 226 of FIG. 3, the device includes two flex areas 250 located near what may be described as the "shoulders" of the device.

In certain embodiments, device 226 may comprise a sensor assembly (not shown in FIG. 3). The sensor assembly may comprise a plurality of different sensors. In an example embodiment, the sensor assembly may comprise or permit operative connection to an accelerometer (including in the form of a multi-axis accelerometer), heart rate sensor, location-determining sensor, such as a GPS sensor, and/or other sensors. Detected movements or parameters from device's 142 sensor(s), may include (or be used to form) a variety of different parameters, metrics or physiological characteristics including but not limited to speed, distance, steps taken, and energy expenditure such as calories, heart rate, sweat detection, effort, oxygen consumed, and/or oxygen kinetics. Such parameters may also be expressed in terms of activity points or currency earned by the user based on the activity of the user.

Figure 4:
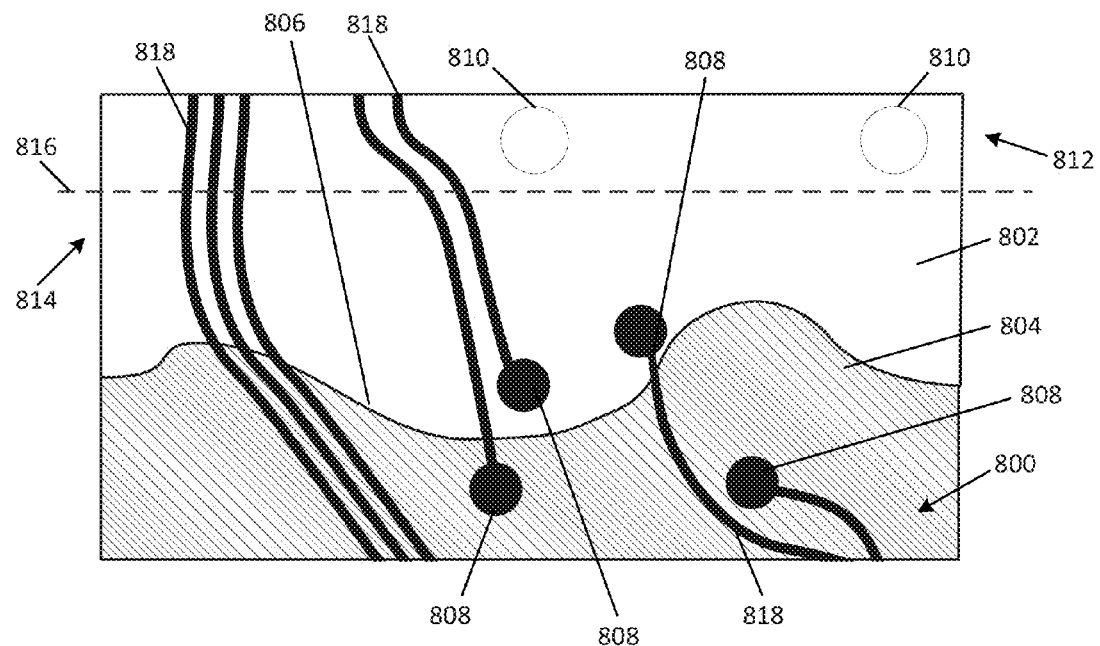
FIG. 4 is another example of an implementation of a curvilinear solder mask edge applied to a flexible circuit member.

FIG. 4 is an example of an implementation of a solder mask 800 applied to a flexible circuit member 802 where the solder mask includes a curvilinear solder mask edge 804 that does not resemble a periodic wave and does not include repeating curve patterns. As seen in FIG. 4, the example curvilinear solder mask edge 804 includes a substantially straight edge portion 806 as discussed above. Additionally, the shape of the curvilinear solder mask edge is configured to curve around various electrical components 808 of the flexible circuit member 804.

FIG. 4 also illustrates construction structures and methods that may be employed, alone or in conjunction with a curvilinear solder mask edge, toward enhancing the survivability of the FPC, including toward enhancing the ability of the FPC to survive stress imparted thereto via any source, including via various deformations (e.g., deformations associated with the flex zones of the FPC and the flexing of the flexible circuit member). As an example, components of the flexible circuit member may be located, positioned, dimensioned, shaped, and so forth, so as to reduce or eliminate the stress either introduced, concentrated, or otherwise that might be associated with the component. In FIG. 4, for example, one or more components 810 on the flexible circuit member 802 (e.g., tooling holes) may be located in a peripheral region 812. Such peripheral region 812 may be variously determined, including, as examples: (i) a region outside any flex area 814 of the flexible circuit member; (ii) an area where the FPC is not deformed in the fabrication process, either via conformal association with the substrate or any production aberrations, such as rippling, and/or (iii) an area wherein stress generally is minimal, e.g., adjacent the USB interconnectors of the flexible circuit member. In FIG. 4, the dotted line 816 identifies where the flex area 814 and the region 812 outside the flex area begin and end respectively. In FIG. 4, as another example, one or more components 810 on the flexible circuit member 802 (e.g., traces 818) may be located on a selected (e.g., inner) surface of the FPC, i.e., a surface other than (i) the top or bottom surfaces or (ii) any other surfaces or areas of the FPC wherein traces may be (a) plated or otherwise protected in any manner that may reduce their elasticity and/or (b) associated with a stress concentrator, like a solder mask or ripple. Additionally or alternatively, the traces 818 of the flexible circuit member 802 may exhibit gradual curves so as to avoid stress concentrations on the traces. As seen in FIG. 4, the example traces 818 may be formed so as to curve gradually, e.g., such as across a flexible zone 250 or other FPC deformation, or across an area of stress as to the flexible circuit member 802. Additionally or alternatively, the traces 818 of the flexible circuit member 802 may be routed so as to avoid stress regions, e.g., concentrators, particularly in a stress region wherein stress is accompanied by one or more structures that are stress concentrators. As an example, each trace 818 that electrically couples to a respective one of the USB interconnect pads may contact that respective pad in an internal portion of that pad (e.g., rather than at peripheral edge of such pad), and therefrom route through a via to an inner surface of the FPC, and therefrom route along the length of, but between, the pads, so as to emerge beyond the transverse edge of the pads (such transverse edge being directed toward the FPC components), so emerging without passing directly under such transverse edge of any pad, and therefrom ultimately to couple with one or more other FPC components. In so routing such USB-coupled traces to, the traces avoid passing under the pad's transverse edge, these traces and, as such, avoid this stress concentrator. In an example, so routing such USB-coupled traces avoids the action of the pad edge as a stress concentrator, where stress may be variously imparted, e.g., via an FPC ripple formed adjacent to the USB contacts. One or more of these and other features may be used in combination with the curvilinear solder mask edge, e.g., particularly if sources of stress, e.g., deformations are or may become present.

Figure 5:
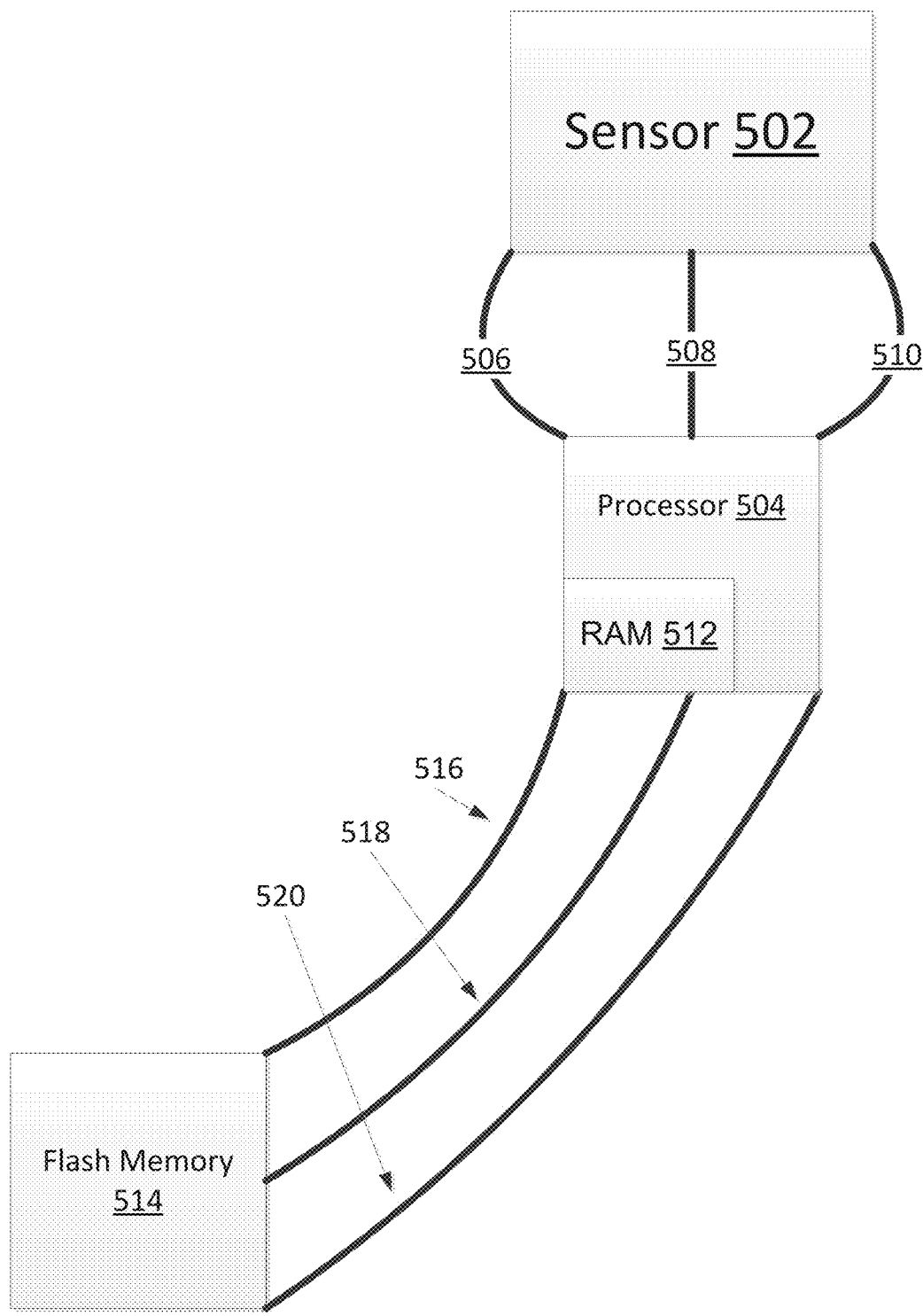
FIG. 5 shows traces connecting the flash memory to the processor and RAM and traces connecting the process to a sensor.

FIG. 5 illustrates components that may be found within wrist-worn sensory assembly device 226 (shown in FIG. 3), in accordance with an embodiment of the invention. A sensor 502 is connected to a processor 504 via traces 506, 508 and 510. Sensor 502 may be implemented with any of the sensors described above. Traces 506, 508 and 510 may be formed on flexible circuit boards. Processor 504 includes a random access memory (RAM) 512 and is connected to a flash memory 514 via traces 516, 518 and 520. Traces 516, 518 and 520 may also be formed on flexible circuit boards. Those skilled in the art will appreciate the numbers of traces and configurations of traces shown in FIG. 5 are for illustration purposes only. Additional or fewer traces may be included and at least some may have irregular shapes. In operation, sensor data from sensor 502 is sent to processor 504. Processor 504 may perform operations such as changing the format of the sensor data, calculating energy expenditure points, etc. Processor 504 then transmits data to flash memory 514 via traces 516, 518 or 520.

Device 226 may be both portable and flexible and as a result, traces 506, 508, 510, 516, 518 and 520 are constantly being stressed and may periodically break. This is especially true when device 226 is flexed by the user. In some embodiments of the invention a fault tolerant approach includes utilizing alternative or redundant traces. For example, if four traces are needed between sensor 502 and processor 504, five, six or seven traces may be formed between the devices. Processor 504 may be configured to determine when a trace is broken and instruct sensor 502 to use one of the alternative traces instead of the broken trace. In some embodiments, processor 504 may be configured to determine when a trace is faulty or inoperable, and may instruct sensor 502 to use one of the alternative traces instead of the faulty or inoperable trace. Sensor 502 may also be configured to identify broken and/or inoperable traces and use alternative traces. Similarly, processor 504 may determine when a trace is broken between processor 504 and flash memory 514 and may start using an alternative trace.

In an alternative embodiment, components shown in FIG. 5 may be configured to share traces when one or more trace breaks. For example, in FIG. 5 sensor 502 and processor 504 may initially use traces 506, 508 and 510. If for example, trace 508 breaks (or becomes inoperable), sensor 502 and processor 504 may be configured to identify the break and share data over another trace, such as trace 510. Sensor data from sensor 502 may be sent to processor 504 during different time periods. For example, the data originally intended to be sent over trace 510 may be sent during a first time period and the data that was originally intended to be sent over the broken trace (e.g., trace 508) may be sent during a second time period. Some embodiments may use alternative division schemes, such as statistical multiplexing and/or other schemes that divide available bandwidth between data originally intended to be sent along a trace and data originally intended to be sent along a broken trace.

The failure of one or more traces 516, 518 and 520 may effectively cause flash memory 514 to become inoperative. Flash memory 514 may of course also become inoperative for reasons unrelated to traces. In one embodiment, when flash memory 514 becomes inoperative or disconnected, processor 504 may store data in RAM 512 instead of in flash memory 514.

In embodiments in which RAM 512 has smaller storage capacity than flash memory 514, a reduced amount of data may be stored. In some embodiments, the device may be configured to determine the remaining memory capacity of the RAM In one of these embodiments, the remaining memory capacity of the RAM may be measured directly by a memory monitoring unit, and such monitoring techniques that may be employed by the memory monitoring unit are well known in the art and thus will not be described in further detail. The determination of whether the RAM is in a "low capacity" condition may thus be made by evaluating whether the measured remaining capacity is below a particular threshold. No matter how the "low capacity" determination is made, a threshold level may be set that allocates the total memory capacity of the RAM between a first period in which the device is in its standard "operational mode" and a second, subsequent period during which the device is in its "low capacity mode," so as to achieve desired operational objectives.

It should be appreciated that, in addition to determining whether the "low capacity" condition discussed above has been reached, the memory capacity of the RAM may additionally be monitored to determine when the RAM is soon to be in the "low capacity" condition. This may be achieved, for example, by employing the same technique used to monitor for the "low capacity" condition, but using a slightly higher or lower threshold. When such a determination is made, a signal or other indication may be transmitted to inform the device that the available memory in RAM is running low and that the device needs to be synced to a network. A message or other indication may be provided to the user as a result of such a signal. For example, in response to a signal indicating the RAM is approaching the "low capacity" condition, a message may be displayed informing the user that memory is "running low," whereas in response to a signal indicating the "low capacity" condition has already been reached, the message may inform the user that the device is "out of memory."

In some embodiments, upon detecting a "low capacity" condition of the device, the mode of operation of the device may be changed so as to substantially reduce the amount of data being stored to RAM. The device may then be allowed to perform only a limited set of functions, and may continue to store some activity data for an extended period of time in spite of its decreased functionality. In certain embodiments, the device may be configured so that the only function it performs while in its "low capacity" mode of operation is the transmission of an indication (or signal) informing the user of the device of its "low capacity" condition. In some embodiments, the capacity of the RAM may additionally be monitored to determine when the RAM is soon to be in a "low capacity" condition, thus enabling the user to be warned that the RAM is "running low and needs to be synced soon," or to be provided with some similar message or indication. Should the user fail to sync the device before the "low capacity" condition is actually reached, the device will not simply cease recording data, but will change modes of operation so as to substantially reduce its data recording capabilities and will continue to inform the user of the "lower capacity" condition of the RAM.

For example, in some embodiments, when it is determined that the memory available in the RAM has been reduced below a first threshold level indicating that the device is approaching a "low capacity" condition, the device may be placed in a first low capacity operational mode where the device may be configured to decrease the amount of data being stored on the RAM. The device may be further configured to determine whether the memory available in the RAM has been reduced below a second threshold level, wherein the amount of available memory on the RAM corresponding to the first threshold level is greater than the amount of available memory on the RAM corresponding to the second threshold level. When it is determined that the memory capacity of the RAM has been reduced below the second threshold level indicating that the device is closer to approaching the "low capacity" condition, the device may be placed in a second low capacity operational mode where the device may be configured to further decrease the amount of data being stored on the RAM.

One way, but not the only way, to reduce the amount of data being stored is to change the format the sensed data is stored in. For example, in some embodiments, the fidelity of the data or frequency of which data points are taken may be decreased. In one of these embodiments where sensor data is stored on RAM, when in the first low capacity low capacity operational mode, the device may be configured to decrease the amount of data being stored on the RAM by storing data in 30 minute segments instead of using one minute segments (like it does when it stores the data on the flash memory, or when storing data in RAM during standard operational modes). In this way, what would normally require sixty individual data entries, may now be reduced to 2 entries. In another of these embodiments where sensor data is stored on RAM, and when the device is in the second low capacity operational mode, the device may be configured to further decrease the amount of data being stored on the RAM by storing data in hour segments instead of using 30 minute segments (like it does when in the low capacity first operational mode). In this way, what would normally require 2 individual data entries, may now be reduced to one entry.

One issue with changing the format the sensed data is stored in is that other devices or programs that interact with the device 226 may only be able to recognize the original format. To deal with this problem, the device can be configured to include a program that can convert the data back into an original format when it is communicating with other computers and programs. For example, if the data was normally stored in minute segments, but was being stored in hour segments to help it fit on the RAM, a program could convert the data back into minute segments by dividing the hour data by 60. This is just one way of converting the data back, other more complex programs might take other factors into account such as scheduled workouts and historical data to make a more realistic conversion. Another possibility would be to store the data in a compressed format on the RAM, and then uncompress it when it is transferred to the network and/or computer.

In another embodiment, the device may decrease the amount of sensor data (or other data) being stored on the RAM by requiring the device to sync with a network, such as network 132, more frequently. A display (e.g., display 136 or display 234), may be configured to indicate an amount of memory available in the RAM for storing sensor data. The display may be further configured to indicate to a user when the RAM has reached a low capacity condition, and transmit a message to the user that the device should be synced with a network. For example, when the device enters into either a first or second low capacity operational mode, the device may communicate a message to the user (via a display), that the device is approaching a low capacity condition, and that one or more functions of the device has been reduced or suspended.

Other possible ways to decrease the amount of data being stored on the RAM may be to require that the device only record certain types of data. For example, the device may be configured to decrease the amount of data being stored on the RAM by recording only activity data, and not recording other types of data, such as the time of day. In one embodiment, In one embodiment, as discussed above, the device may enter a first low capacity operational mode when the RAM reaches a first threshold capacity indicating that the RAM is approaching a low capacity condition. Further to the above example, when the device enters the first low capacity operational mode, the device may be configured to decrease the amount of data being stored on the RAM by recording only activity data, and not other types of data. In other embodiments, when the device enters the second low capacity operational mode, the device may be configured to further decrease the amount of data being stored on the RAM by reducing the fidelity of the activity data. In another embodiment, when in the second low capacity operational mode, the device may be configured to further decrease the amount of data being stored on the RAM by reducing or suspending one or more other data recording functions, other than the recording of activity data.

In some embodiments of the invention there is no indication to an end user that data is stored in RAM 512 or flash memory 514. The device makes data presented to users and even other devices appear the same.

Conclusion

Providing an activity environment having one or more of the features described herein may provide a user with an experience that will encourage and motivate the user to engage in athletic activities and improve his or her fitness. Users may further communicate through social communities and challenge one another to participate in point challenges.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

What is claimed is:

1. A device that monitors movements of a user comprising:
   a sensor configured to sense movement and generate sensor data;
   a processor connected to the sensor and programmed with computer-executable instructions that, when executed by the processor, cause the device to perform the steps of:
   (a) identifying when a connection to a flash memory is available;
   (b) when the connection to the flash memory is available sending the sensor data to the flash memory via a first set of traces; and (c) when the connection to the flash memory is not available, storing sensor data in a RAM of the processor.

2. The device of claim 1, wherein (c) comprises storing sensor data in the RAM of the processor at a reduced fidelity.

3. The device of claim 2, wherein the reduced fidelity is due to lower recordings per a given unit of time.

4. The device of claim 2, wherein the reduced fidelity is due to storing the data in a compressed format.

5. The device of claim 2, wherein the reduced fidelity is due to only storing predetermined types of data.

6. The device of claim 1, further comprising:
   redundant traces configured to accept data from other traces in the first set of traces, if they break.

7. The device of claim 1, further comprising:
   extra traces configured to be used if a given trace in the first set of traces breaks.

8. The device of claim 6, wherein the processor is further programmed and adapted to perform:
   accepting, at the redundant traces, data from other traces in the first set of traces.

9. A device that monitors movements of a user comprising:
   a sensor configured to sense movement and generate sensor data;
   a processor connected to the sensor and programmed with computer-executable instructions that, when executed by the processor, cause the device to perform the steps of:
   (a) identifying when a flash memory fails;
   (b) when the flash memory has not failed sending the sensor data to the flash memory; and
   (c) when the flash memory fails storing sensor data in a RAM of the processor.

10. The device of claim 9, wherein the executable instructions, when executed by the processor, further cause the device to perform the steps of:
    (d) determining whether the RAM is approaching a first low capacity threshold; and
    (e) in response to determining that the RAM of the processor has reached the first low capacity threshold, operating in a first operational mode wherein sensor data is stored in the RAM of the processor at a reduced fidelity.

11. The device of claim 10, wherein the reduced fidelity is due to lower recordings per a given unit of time.

12. The device of claim 10, wherein the reduced fidelity is due to only storing predetermined types of data.

13. The device of claim 10, wherein the reduced fidelity is due to storing the data in a compressed format.

14. The device of claim 10, wherein the low capacity threshold corresponds to a remaining memory capacity of the RAM of the processor.

15. The device of claim 10, wherein the executable instructions, when executed by the processor, further cause the device to perform the steps of:
    (f) determining whether the RAM is approaching a second low capacity threshold; and
    (g) in response to determining that the RAM of the processor has reached the second low capacity threshold, operating in a second operational mode wherein the device is configured to cease one or more data recording functions performed by the device.

16. The device of claim 15, wherein the second low capacity threshold is set at a level greater than the first low capacity threshold.

17. A device that monitors movements of a user comprising:
    a sensor configured to sense movement and generate sensor data;
    a flash memory;
    a processor connected to the sensor and the flash memory via a first set of traces and programmed with computer-executable instructions that, when executed by the processor, cause the device to perform the steps of:
    (a) identifying when at least a first trace in the first set of traces connecting the processor and the flash memory fails;
    (b) when at least the first trace connecting the processor and the flash memory does not fail, transmitting data from the processor to the flash memory with a first transmission scheme; and
    (c) when at least the first trace connecting the processor and the flash memory does fail, transmitting data from the processor to the flash memory with a second transmission scheme different from the first transmission scheme, wherein the transmission uses available traces in the first set of traces.

18. The device of claim 17, wherein the second transmission scheme is a time division scheme.

19. The device of claim 17, wherein the second transmission scheme is a statistical multiplexing scheme.

20. The device of claim 17, further comprising:
    redundant traces configured to accept data from at least the first trace.

* * * * *